March 9, 1965 E. E. SUTTON ETAL 3,172,999
ELECTRIC GRILL CONSTRUCTION
Filed June 22, 1962 2 Sheets-Sheet 1
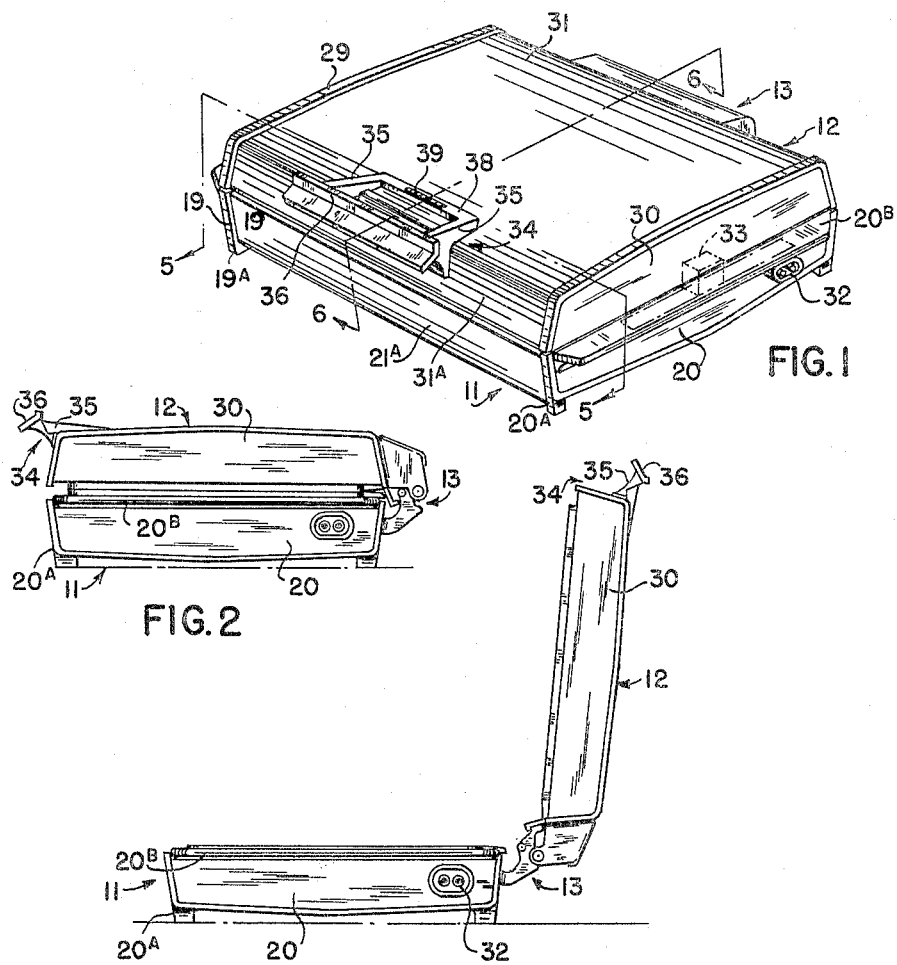
INVENTORS
GEORGE E. HANNER
BY EARL E. SUTTON
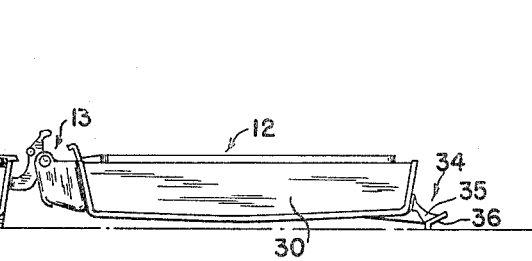
ATTORNEYS

INVENTOR.
GEORGE E. HANNER
BY EARL E. SUTTON

ATTORNEYS

United States Patent Office 3,172,999
Patented Mar. 9, 1965

3,172,999
ELECTRIC GRILL CONSTRUCTION
Earl E. Sutton and George E. Hanner, Mansfield, Ohio, assignors to Dominion Electric Corporation, a corporation of Ohio
Filed June 22, 1962, Ser. No. 204,419
7 Claims. (Cl. 219—524)

Our invention relates to the construction of electric grills and the like, and to a method of constructing or assembling the same.

An object of our invention is to provide a an economical and efficient construction for an electric grill, such as a grill for making waffles or for toasting sandwiches and the like.

Another object is the provision for an economical construction for an electric grill well adapted for efficient and rapid assembly.

Another object is the provision for making an electric grill of improved form and arrangement of parts.

Another object is the provision of a new method for constructing or assembling an electric grill facilitating rapid production.

Another object is the provision for obtaining improved results in a unique and novel manner in the construction of electric grills and the like.

Other objects and a fuller understanding of the invention may be had by referring to the following description and claims, taken in conjunction with the accompanying drawings, in which:

FIGURE 1 is a top perspective view of an electric grill made in accordance with our invention and showing the top portion in lowered or closed position;

FIGURE 2 is a right-hand end view of the grill shown in FIGURE 1;

FIGURE 3 is a right-hand end view of the grill shown in FIGURE 1 but with the top portion raised and held in an upright position;

FIGURE 4 is a right-hand end view of the grill shown in FIGURE 1 but with the top portion lowered to open horizontal position;

Figure 5:
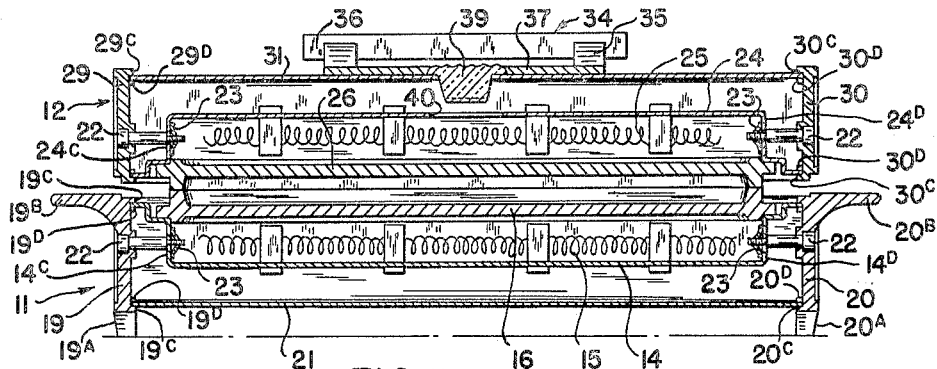
FIGURE 5 is an enlarged sectional view looking in the direction of the arrows 5—5 of FIGURE 1.

Our grill has a base portion denoted generally by the reference character 11 and a top portion denoted generally by the reference character 12 which are hingedly connected together by a hinge mechanism denoted generally by the reference character 13. The detail of the hinge mechanism 13 is shown and described in co-pending patent application of George E. Hanner, one of the inventors of the present invention.

The base portion 11 has a chassis 14 which is of general rectangular pan shape. The chassis 14 has upturned marginal sides 14A, 14B, 14C and 14D. Sides 14A and 14B are opposite each other and sides 14C and 14D are opposite each other. An electrical resistance heating element 15 is positioned in and carried by the chassis 14 in the usual manner. A heating grid 16 is carried by the chassis 14 over the heating element 15 so as to be heated thereby. The grid 16 is reversible and may have a flat heating surface on one side and a waffle surface on the other side so that one may selectively make waffles thereon or toast sandwiches or other food on the other side.

The upturned side 14A of the chassis 14 has a fixed lip 17 formed by bending over a portion thereof so as to interengage with an edge of the grid 16. Secured to the chassis 14 and adjacent the upturned side 14B is a spring clip 18 also adapted to interengage with an edge of the grid 16. Thus the grid 16 may be firmly held to the chassis 14 but may also be selectively removed and reversed.

Figure 6:
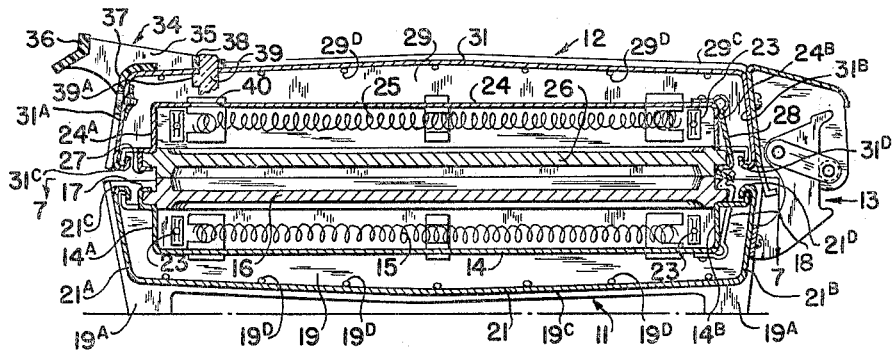
FIGURE 6 is an enlarged sectional view looking in the direction of the arrows 6—6 of FIGURE 1.
Figure 7:
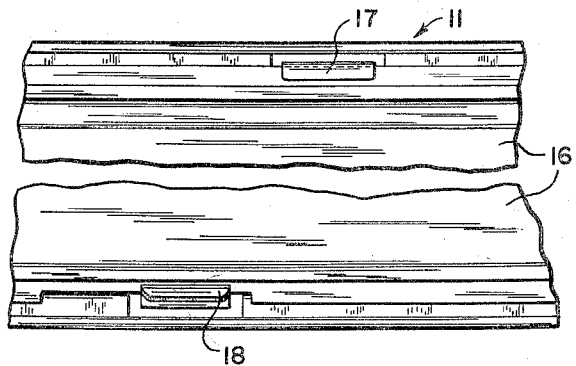
FIGURE 7 is a view, partially broken, looking in the direction of the arrows 7—7 of FIGURE 6.

Spaced from and surrounding the bottom and sides 14A and 14B of the chassis is a channel-shaped metal shell 21. As seen in FIGURES 5 and 6 the shell 21 has a relatively large bottom wall and two spaced walls 21A and 21B extending upwardly therefrom, which together form opposite edge portions of generally U-shape. The side walls 21A and 21B along their upper longitudinal edges are turned over to form turned-up edges or ledges 21C and 21D, respectively. The upper edges of walls 14A and 14B of the chassis 14 are disposed under and in interfitting engagement with the respective ledges or turned-over edges 21C and 21D.

Disposed at the opposite ends of the channel-shaped shell 21 are end-wall members 19 and 20, respectively. The end-wall members 19 and 20 are of suitable heat-insulating material, such as molded Bakelite or other resin plastic. The end-wall member 19 has foot portions 19A extending downwardly therefrom for support of the base portion 11. Extending along the upper edge of the end-wall member 19 is a horizontal handle portion 19B formed for being grasped by the operator in the lifting of the grill. Extending around the inner wall of the end-wall member 19 is a protruding edge portion 19C. Spaced from this edge portion 19C are a plurality of extensions or bosses 19D. The protruding edge portion 19C, together with the bosses 19D spaced therefrom, constitute groove means for accommodating between the edge portion 19C and bosses 19D the end portion of the U-shaped shell 21. The groove means described hold the shell 21 from lateral displacement relative to the end-wall member 19.

Similarly, the end-wall member 20 has foot portions 20A extending downwardly therefrom and a handle portion 20B along its upper edge. There is similarly a protruding edge portion 20C and a plurality of extensions or bosses 20D which also cooperate to form groove means accommodating the opposite end portion of the shell 21. The edge portions 19C and 20C face each other and similarly the bosses 19D and 20D face each other and confine the opposite ends of the shell 21.

Extending through openings provided in the end-wall members 19 and 20 are bolts 22 which protrude through openings in the sides 14C and 14D of the chassis 14. The inner ends of the bolts 22 are threadably secured to nuts or fastening devices 23. Thus the end-wall members 19 and 20 are firmly secured to opposite ends of the chassis 14. This, in turn, holds the end-wall members 19 and 20 firmly to the opposite ends of the shell 21.

Secured to the wall 21B of the shell 21 by threaded members is the lower hinge portion of the hinge mechanism 13. Thus the top portion 12 of the grill is hingedly interconnected with the base portion 11 of the grill.

The top portion 12 includes an upper chassis 24 also of rectangular pan shape. This chassis 24 has side walls 24A, 24B, 24C and 24D extending from its four peripheral edges. An electrical resistance heating element 25 is carried by the chassis 24 between the side walls thereof in the usual manner. A grid 26 is carried by the chassis 24 so as to engage the four side walls thereof and to be held thereto by a fixed lip 27 (similar to lip 17) and by a spring clip 28 (similar to spring clip 18). The grid 26 also is reversible so as to present a waffle surface or a flat surface, as desired.

A channel-shaped metal shell 31 is spaced from and disposed around the chassis 24 so as to cover the top thereof and the two opposite side walls 24A and 24B. The shell 31 also has opposite end portions of channel shape similar to the cross-sectional shape of the shell 31.

End-wall members 29 and 30 are disposed at the opposite ends of the shell 31. The end-wall members 29 and 30 are also made of Bakelite or other molded resin composition or other suitable heat insulating material. End-wall member 29 has a protruding edge portion 29C extending therearound and which faces similar protruding edge portion 30C of the end-wall member 30. Also the end-wall member 29 has a plurality of extensions or bosses 29D spaced from the protruding edge portion 29C to form an effective groove therebetween. The end-wall member 30 also has a plurality of extensions or bosses 30D spaced from the protruding edge portion 30C to form in effect a groove therebetween. The grooves thus formed in the end-wall members 29 and 30 confine the end portions of the shell 31 against lateral displacement relative to the respective end-wall members 29 and 30.

There are also bolts 22 extending through the end-wall members 29 and 30 and into the walls 24C and 24D of the chassis 24, and the ends of the bolts 22 are secured to nuts or fastening devices 23. The end-wall members 29 and 30 are thus secured to opposite walls of the chassis 24 and these walls, in turn, are firmly held to the shell 31 so as to embrace the shell 31 between the end-wall members 29 and 30.

The shell 31 has two spaced side walls 31A and 31B extending from the broad major portion of the shell 31. The longitudinal edges of the side walls 31A and 31B are bent over to form turned-over edge portions or ledges 31C and 31D, respectively. The longitudinally disposed edges of the walls 24A and 24B of the chassis 24 fit within and are held by the ledge portions 31C and 31D, respectively.

An electric socket or receptacle 32 is carried by the end-wall member 20 of the base portion 11. The terminals of the socket 32 are connected by suitable electrical connections with the heating element 15 in the base portion 11 and with the heating element 25 in the top portion 12. A flexible cable, not shown, carries the wires between the top portion and the base portion near the hinge mechanism 13. A thermostat adjusting handle 33 extends up from the base portion 11 and is movable along an indicia-bearing plate on the handle 20B of the end-wall member 20.

The end-wall members 29 and 30 differ from the end-wall members 19 and 20 in that the end-wall members 29 and 30 do not have foot portions nor handle portions.

A handle member denoted generally by the reference character 34 is secured to the top portion 12 adjacent its edge or side farthest removed from the hinge mechanism 13. This handle member 34 is also made of Bakelite, other molded resin plastic, or other suitable heat insulated material. The handle member 34 has side bars 35 inclined up at an angle and which terminate with a crossbar 36 interconnecting the side bars 35. This crossbar 36 provides both a handle to be held by the operator in swinging the top portion 12 and also provides a foot or support for the top portion 12 when the top portion 12 is swung to its open horizontal position, shown in FIGURE 4. It is seen in FIGURE 4 that the top portion 12 is supported on one side by the hinge mechanism 13 and on the other side by the crossbar 36 of the handle member 34.

A corner or intermediate section 37 interconnects the side bars 35 at the corner or margin of the shell 31 of the top portion 12. The corner section 37 snugly engages and complements the shape of the corner portion of the shell 31. There is an inward end section 38 interconnecting the ends of the side bars 35 at a distance from the crossbar 36 and at a location over the top of the shell 31. The handle member 34 is preferably made of one integral molded piece of material. Suitable nut and bolt assemblies hold the handle member 34 to the shell 31 of the top portion 12.

A light-transmitting member 39 extends through an opening provided in the end section 38 and through an aligned opening in the shell 31. It is also in alignment with an opening 40 in the chassis 24 whereby light from the heating element 25, when energized and aglow, is transmitted through the opening 40 in the chassis 24 and thence through the member 39 positioned in the openings in the shell 31 and end section 38 so as to be visible from above the grill. This light-transmitting member 39 is made of glass, clear plastic, or other suitable light-transmitting material. The light-transmitting member 39 has a boss or projection 39A which complements the shape of a side of the opening in the shell through which the member 39 extends. This irregularity in the shape of the member 39 and the opening in the shell assures that the member 39 can be mounted only in the one position shown and not reversed. The end section 38 at the opening therein overlaps the upper edge of the member 39 so as to hold it downwardly in position. Thus, the member 39 is held against disengagement by the overlapping portion of the end section 38 of the handle member 34. The member 39 may be removed by the removal of the handle 34 which tightly embraces the member 39 and then by the upward withdrawal of the member from under the shell 31.

The lower surface of the light-transmitting member 39 is at an incline as indicated in FIGURE 6. The direction of this incline is as shown. Also this lower surface of the member 39 has longitudinally extending serrations providing an uneven or ridged surface for catching and reflecting light from the heating element 25. The inclination of the lower surface and the serrations thereon provides a series of stepped surfaces directed toward the central portion of the heating element for catching light generally from the heating element. The upper surface of the light-transmitting member 39 is serrated transversely, that is, at right angles to the serrations in the lower surface of the member 39. These ridges or irregularities in the upper surface diffuse the light to send it in a plurality of directions. It is found that between the lower serrations and the upper serrations, out of phase with each other by 90 degrees, a good light-transmitting action is provided so that there is a bright, clear indication of the glow obtained through energization of the heating element 25.

Our invention includes the method of assembling the grill. First, the chassis 14 carrying the heating element 15 is slid into the shell 21 by an end-to-end movement so as to position the upper edges of the walls 14A and 14B of the chassis 14 under the ledges 21C and 21D of the shell 21. When the parts have been slid together and interfitted into the relative positions shown in FIGURES 5 and 6, then the bolts 22 are placed through the end-wall members 19 and 20 and the end-wall members 19 and 20 are positioned over the opposite ends of the shell 21 so as to confine the ends of the shell 21 within the groove means provided by 19C–19D and by 20C–20D. Thereafter, the bolts 22 are secured to the nuts or fastening devices 23 so as to firmly hold the parts together in the position illustrated in the drawings.

The handle 34 is assembled to the shell 31 by first inserting the light-transmitting member 39 into position through the aligned openings and then by securing the handle 34 to the shell 31. Thereafter, the chassis 24 is slid longitudinally into the shell 31 so as to position the edges of the walls 24A and 24B within the turned-over portions or ledges 31C and 31D, respectively. By a sliding movement, the chassis 24 carrying the heating element 25 is moved to within the shell 31 to the relative position illustrated in the drawings. Thereafter the bolts 22 and fastening devices 23 are assembled with the end-wall members 29 and 30 to the chassis 24. This secures the end-wall members to the shell 31 with the opposite ends of the shell 31 firmly held and confined by the groove means 29C–29D and 30C–30D.

The assembled base portion 11 and top portion 12 are then interconnected with the hinge mechanism 13 to provide the complete assembly having the construction illustrated in the drawings.

The present disclosure includes that contained in the appended claims as well as in the foregoing description.

Although this invention has been described in its preferred form with a certain degree of particularity, it is understood that the present disclosure of the preferred form has been made only by way of example and that numerous changes in the details of construction and in the combination and arrangement of parts may be resorted to without departing from the spirit and scope of the invention as hereinafter claimed.

What is claimed is:

1. An electric grill construction comprising a top cooking part and a base cooking part hingedly connected together and adapted to cook food therebetween, each of said parts having a stamped metal shell having a channel-shaped in cross-section, the sides of each channel having inwardly turned longitudinal edges forming parallel ledges, said channel-hsaped shell having opposite end portions, each of said parts having a chassis of rectangular pan shape, said chassis having upright end walls at its opposite ends corresponding with the opposite end portions of said channel-shaped shell, an electric heating element carried by said chassis, two of the opposite sides of said chassis being formed to be disposed under said ledges and to interfit therewith, said chassis being positioned in said shell by being slid longitudinally thereof between said sides of the channel with said opposite sides of the chassis disposed under said ledges, each of said parts having end-wall members disposed at the opposite ends of said channel-shaped shell, said end-wall members being spaced from the upright end walls of said chassis to provide a space therebetween, each said end-wall member having edge-confining portions protruding therefrom toward edge-confining portions of the opposite end-wall member and confining the opposite edge portions of said shell-shaped channel to embrace the same against displacement laterally of the end-wall member, and fastening members extending across said space through the respective end-wall members and engaged to said chassis within the channel-shaped shell to secure the end-wall members to the channel-shaped shell therebetween.

2. An electric grill comprising a metal shell member of substantially channel shape, said shell member having opposite end portions and having longitudinal edge portions disposed along the edges of the side walls of the shell member, a chassis of rectangular pan shape having side walls extending upwardly along the four sides thereof, said chassis carrying an electric heating element and a grid adjacent the heating element, the longitudinal edge portions of said shell member being folded over along a first pair of opposite side walls of said chassis, a pair of end-wall members disposed adjacent opposite ends of said shell member and spaced from a second pair of opposite side walls of said chassis to define an open space therebetween, each end-wall member having edge-confining portions extending toward edge-confining portions of the oppositely disposed end-wall member, said edge-confining portions confining the opposite end portions of the shell member along the base end sides thereof against lateral displacement relative to the respective end-wall member, and a plurality of bolts extending across said space through said end-wall members and anchored to said second pair of opposite side walls of said chassis and holding said end-wall members against said shell member, said end-wall members including supporting means for supporting the grill and handle means for lifting the grill.

3. An electric grill comprising a rectangular pan-shaped chassis carrying an electric heating element and a grid disposed in heat-receiving relationship to the heating element, a channel-shaped metal shell member extending along the bottom and along a first pair of opposite sides of the chassis, the opposite side walls of the shell member extending over and inwardly of a first pair of opposite sides of said chassis in a longitudinally slidable fit therewith, a pair of end-wall members of heat-insulating material disposed at the opposite ends of said shell member, said end-wall members and the other sides of said channel defining spaces therebetween, respectively, said end-wall members each having groove means formed therein on the side facing the opposite end-wall member and extending adjacent the bottom and sides of the end-wall member in conformity with the shape of the opposite end portions of the shell member, said groove means confining said opposite end portions of the shell member to retain the same against lateral displacement relative to the respective end-wall member, securing means extending across the said spaces and interconnecting said end-wall members and chassis to hold said shell member embraced between said end-wall members, support means carried by said end-wall members for supporting the grill, and handle means carried by the end-wall means for lifting the grill.

4. In an electric grill, the combination of a rectangular pan-shaped chassis having up-turned sides, an electric heating element carried by the chassis between said up-turned sides, a cooking grid supported by said up-turned sides, manually disengageable means for holding said grid on said sides, a channel-shaped metal shell member surrounding the bottom and a pair of opposite side walls of the chassis, said shell member having opposite longitudinally disposed edge portions folded over the said pair of opposite side walls, respectively, said shell member having opposite end portions having said channel shape, a pair of end-wall members of molded heat-insulating material disposed at the opposite ends of said shell member and around said opposite end portions thereof to support the bottom and side walls of the shell member, said end-wall members being spaced from adjacent up-turned sides of the chassis to define a space at each of said opposite ends, means extending across the respective said spaces for securing the end-wall members to said chassis to hold the end-wall members against the opposite end portions of the shell member therebetween to embrace the same, said end-wall members extending downwardly beyond the bottom of the shell member to support the grill upon a surface and extending outwardly of the ends of the shell member to provide handle means for lifting the grill.

5. An electric grill having upper and lower parts hingedly connected for the cooking of food between grids carried by the parts, respectively, each part comprising a chassis for carrying an electric heating element and a cooking grid, said chassis having upright marginal walls, a channel-shaped metal shell member surrounding the chassis on the bottom and two opposite side walls thereof, and a pair of end-wall members at the other opposite side walls of the chassis and interlocked with the opposite ends of the shell member, said end-wall members and said shell member being spaced from the upright marginal walls of said chassis and overlapping the edges of the upright marginal walls of said chassis to hold the same between the sides of the shell member and between the end-wall members, the upper part of the grill having an opening extending through the shell member thereof, a light-transmitting member disposed in said opening to transmit light from the heating element carried by said upper part through the shell member, and a handle member secured to the said upper part for swinging the same relative to the said lower part, said handle member having an opening therethrough for accommodating said light-transmitting member, said handle member overlapping the light-transmitting member to retain it in the opening in the shell member of the upper part.

6. In an electric grill having an upper part connected by hinge means to a lower part, said upper part carrying an electric resistance heating element for heating a grid carried by the upper part, the upper part having a pan-like chassis, said chassis having upright marginal walls and a back wall extending therebetween upon which the heating element is mounted and a metal shell spaced from said back wall of the chassis and from a pair of opposite upright marginal walls of the chassis, said chassis and shell having aligned openings therethrough adjacent the side furthest removed from said hinge means, a light-transmitting member extending through the said opening in the shell and aligned with the said opening in the chassis to receive light from the said heating element upon energization thereof, said light-transmitting member having a serrated lower surface to receive light and a serrated upper surface to transmit light, the serrations in the lower surface being disposed at substantially right angles to the serrations in the upper surface whereby light transmitted through the light-transmitting member is modified thereby, and a handle member of heat insulating material secured to the shell of said upper part for swinging the same on said hinge means, said handle member having an opening therein and framing the light-transmitting member to expose the same, the handle member adjacent said opening overlapping an edge of the light-transmitting member to retain the same in said shell.

7. In an electric grill, the combination of chassis means carrying a grid and electrical resistance heating means for heating the grid, a channel-shaped metal shell spaced from and disposed about the chassis to enclose three sides thereof, a pair of end-wall members spaced from and in alignment with opposite two other sides of the chassis and joined with the opposite ends of the said shell to form with said shell five sides of a casing enclosing said chassis, said chassis being slidable end-wise into said shell from one of said opposite ends of the shell and said end-wall members being securable to said chassis to hold the chassis within said shell and the end-wall members to the shell, said shell and end-wall members overlapping the sides of said chassis to retain the same from withdrawal from the casing formed by said shell and end-wall members.

References Cited in the file of this patent

UNITED STATES PATENTS

| | | |
|---|---|---|
| 1,684,751 | Tugendhat | Sept. 28, 1928 |
| 2,179,761 | Smith | Nov. 14, 1939 |
| 2,274,285 | Wallur | Feb. 24, 1942 |
| 2,430,582 | Reich | Nov. 11, 1947 |
| 2,686,961 | Ellefsen | Aug. 24, 1954 |
| 2,780,707 | Rand et al. | Feb. 5, 1957 |
| 2,869,228 | Martin | Jan. 20, 1959 |
| 2,899,888 | Koci | Aug. 18, 1959 |